(12) United States Patent
Schramm

(10) Patent No.: US 6,967,753 B2
(45) Date of Patent: Nov. 22, 2005

(54) PLANE DEPENDENT COMPRESSION

(75) Inventor: Morgan T Schramm, Portland, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 865 days.

(21) Appl. No.: 09/919,647

(22) Filed: Jul. 31, 2001

(65) Prior Publication Data
US 2003/0025941 A1 Feb. 6, 2003

(51) Int. Cl.$^7$ .............................. H04N 1/46; G06K 9/00
(52) U.S. Cl. ....................... 358/530; 382/166
(58) Field of Search .................. 358/1.9, 2.1, 515, 358/517, 520, 530; 382/163, 162, 166, 167

(56) References Cited

U.S. PATENT DOCUMENTS

| 4,924,301 A | * | 5/1990 | Surbrook ............... 358/534 |
| 5,111,302 A | | 5/1992 | Chan et al. ............. 358/534 |
| 5,377,024 A | | 12/1994 | Dillinger ............... 358/502 |
| 5,402,245 A | | 3/1995 | Motta et al. ............ 358/1.9 |
| 5,473,446 A | | 12/1995 | Perumal, Jr. et al. ..... 358/523 |
| 5,537,228 A | | 7/1996 | Dillinger ............... 358/502 |
| 5,657,137 A | | 8/1997 | Perumal, Jr. et al. ..... 296/358 |
| 5,710,827 A | | 1/1998 | Perumal, Jr. et al. ..... 382/767 |
| 5,809,217 A | | 9/1998 | Bunce ................... 358/1.9 |
| 5,812,744 A | | 9/1998 | Allebach et al. ......... 358/1.9 |
| 5,898,505 A | | 4/1999 | Lin et al. .............. 358/3.1 |
| 5,903,366 A | | 5/1999 | Hirabayashi et al. | |
| 5,930,010 A | | 7/1999 | Cheung et al. .......... 358/534 |
| 5,949,964 A | | 9/1999 | Clouthier et al. | |
| 5,949,965 A | | 9/1999 | Gondek | |
| 5,973,803 A | | 10/1999 | Cheung et al. | |
| 5,974,228 A | | 10/1999 | Heitsch | |
| 5,982,990 A | | 11/1999 | Gondek | |
| 5,991,512 A | | 11/1999 | Shaked et al. | |
| 6,057,933 A | | 5/2000 | Hudson et al. | |
| 6,346,993 B1 | * | 2/2002 | Curry ................... 358/1.9 |
| 6,501,851 B1 | * | 12/2002 | Kondo et al. ........... 382/162 |

FOREIGN PATENT DOCUMENTS

| EP | 1021034 | 7/2000 | ............. H04N 1/64 |
| JP | 407147638 A | * 6/1995 | ............. H04N 1/41 |

OTHER PUBLICATIONS

Hewlett-Packard Company patent application; U.S Appl. No. 08/812,777; filed on Mar. 6, 1997; "Fast Error Diffusion Algorithm.".

* cited by examiner

Primary Examiner—Jerome Grant, II
(74) Attorney, Agent, or Firm—Gregg W. Wisdom

(57) ABSTRACT

A method includes forming a third halftone color plane, a fourth halftone color plane, and a fifth halftone color plane from a first halftone color plane and a second halftone color plane. In addition, the method includes performing a compression on the third halftone color plane, the fourth halftone color plane, and the fifth halftone color plane. An apparatus includes a processing device configured to form a third halftone color plane, a fourth halftone color plane, and a fifth halftone color plane from a first halftone color plane and a second halftone color plane. In addition, the apparatus includes a configuration to perform a compression on the third halftone color plane, the fourth halftone color plane, and the fifth halftone color plane to generate compressed halftone data and to decompress the compressed halftone data to generate decompressed halftone data. Furthermore, the apparatus includes a memory configured to store the compressed and the decompressed halftone data.

30 Claims, 16 Drawing Sheets

■ NOT WHITE  □ NOT CYAN OR MAGENTA (WHITE)

```
for each pixel at i,j, in the halftoned image
{
   // Check C and M together to fill the Blue bit plane
   if m(i,j) == 1 AND c(i,j) == 1
   {
      b_plane(i,j) = 1;    // add a 1 to the blue plane
   }
   else    // not blue, must add entry to white plane
   {
      b_plane(i,j) = 0;    // set blue plane to 0 if m(i,j) == 1 OR c(i,j) == 1    // if NOT white
      {
         white_plane(w_curr_location) = 0;
         if m(i,j)== 1
             C/M_plane(cm_curr_location) = 1;
         else
             C/M_plane(cm_curr_location) = 0;

Increment w_curr_location, cm_curr_location;
      }
      else    // its white so add a 1 to the white plane
      {
         white_plane(w_curr_location) = 0;
         Increment w_curr_location;
      }

} // end else blue

} // end for each pixel in ht image

RLE_encode(B_plane);
RLE_encode(W_plane);
RLE_encode(C/M_plane);
```

FIG. 13

| UNCOMPRESSED HALFTONE FILE SIZE | COMPRESSED HALFTONE FILE SIZE |
|---|---|
| 3.6 MEGA BYTE | 2.6 MEGA BYTE |
| 1.7 MEGA BYTE | 1.0 MEGA BYTE |
| 3.6 MEGA BYTE | 2.2 MEGA BYTE |
| 3.6 MEGA BYTE | 2.1 MEGA BYTE |

FIG. 14

PLANE DEPENDENT COMPRESSION

Halftone data, corresponding to halftoned images, are compressed to reduce the memory capacity used to store a halftoned image and to achieve more rapid transmission of halftone data through an imaging device. Improvement in the compression ratio will reduce the time required for transmission of the halftone data and reduce the memory capacity used to store the compressed halftone data.

SUMMARY OF THE INVENTION

A method includes forming a third halftone color plane, a fourth halftone color plane, and a fifth halftone color plane from a first halftone color plane and a second halftone color plane. In addition, the method includes performing a compression on the third halftone color plane, the fourth halftone color plane, and the fifth halftone color plane.

An apparatus, includes a processing device configured to form a third halftone color plane, a fourth halftone color plane, and a fifth halftone color plane from a first halftone color plane and a second halftone color plane. In addition, the apparatus includes a configuration to perform a compression on the third halftone color plane, the fourth halftone color plane, and the fifth halftone color plane to generate compressed halftone data and to decompress the compressed halftone data to generate decompressed halftone data. Furthermore, the apparatus includes a memory configured to store the compressed and the decompressed halftone data.

An imaging device, includes a processing device configured to form a third halftone color plane, a fourth halftone color plane, and a fifth halftone color plane from a first halftone color plane and a second halftone color plane. In addition, the processing device includes a configuration to perform a compression on the third halftone color plane, the fourth halftone color plane, and the fifth halftone color plane to generate compressed halftone data and to decompress the compressed halftone data to generate decompressed halftone data. Furthermore, the imaging device includes a memory configured to store the compressed and the decompressed halftone data. Additionally, the imaging device includes an imaging mechanism configured to place colorant on media according to the decompressed halftone data.

DESCRIPTION OF THE DRAWINGS

A more thorough understanding of embodiments of the compression apparatus and compression method may be had from the consideration of the following detailed description taken in conjunction with the accompanying drawings in which:

FIG. 13 shows pseudo code for an embodiment of the compression method.

FIG. 14 includes a table illustrating the effectiveness of an embodiment of the compression method.

DETAILED DESCRIPTION OF THE DRAWINGS

Although embodiments of the compression method will be discussed in the context of an inkjet printer, it should be recognized that embodiments of the compression method are readily adaptable to other embodiments of imaging devices. For example, an embodiment of the compression method could be used in an electrophotographic imaging device, such as an electrophotographic printer, electrophotographic copier, or fax machine to improve compression performance. Or, an embodiment of the compression method could be used in an electrophotographic imaging device that uses liquid toner. Furthermore, embodiments of the compression method are useful, in general, in embodiments of imaging devices that store color information in a binary fashion (for example video display systems) or place colorant on media in a binary fashion.

Figure 1:
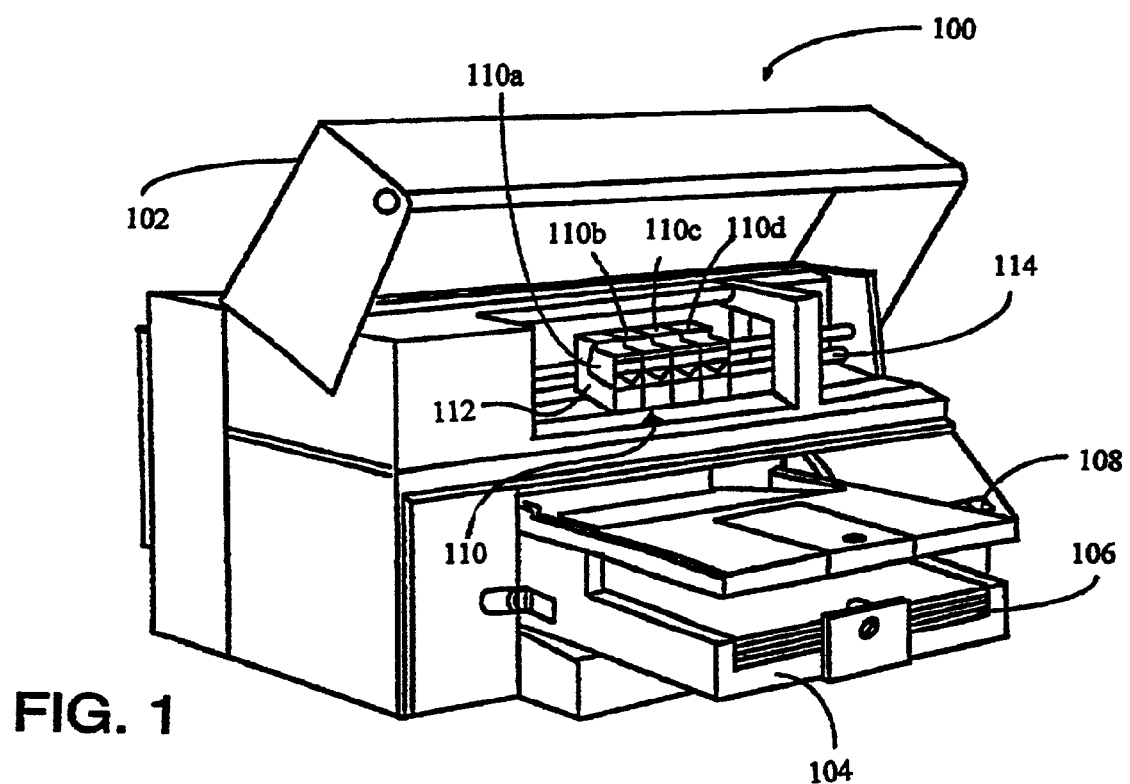
FIG. 1 shows an exemplary ink-jet printer.

Shown in FIG. 1 is an embodiment of an imaging device, color inkjet printer 100, that includes processing circuitry used in performing an embodiment of the compression method. Color inkjet printer 100 includes a cover 102, a media input tray 104 for holding media 106 to be used in an imaging operation, a media output tray 108 for receiving the units of media 106 on which images have been formed, color cartridges 110 (including a cyan cartridge 110a, a magenta (M) cartridge 110b, a yellow (Y) cartridge 110c, and a black (K) cartridge 110d), and a scanning carriage 112 for sliding along a slide bar 114 while colorant from one or more of color cartridges 110 is placed onto pixels. In color inkjet printer 100, the colorant stored in color cartridges 110 includes ink.

Figure 2:
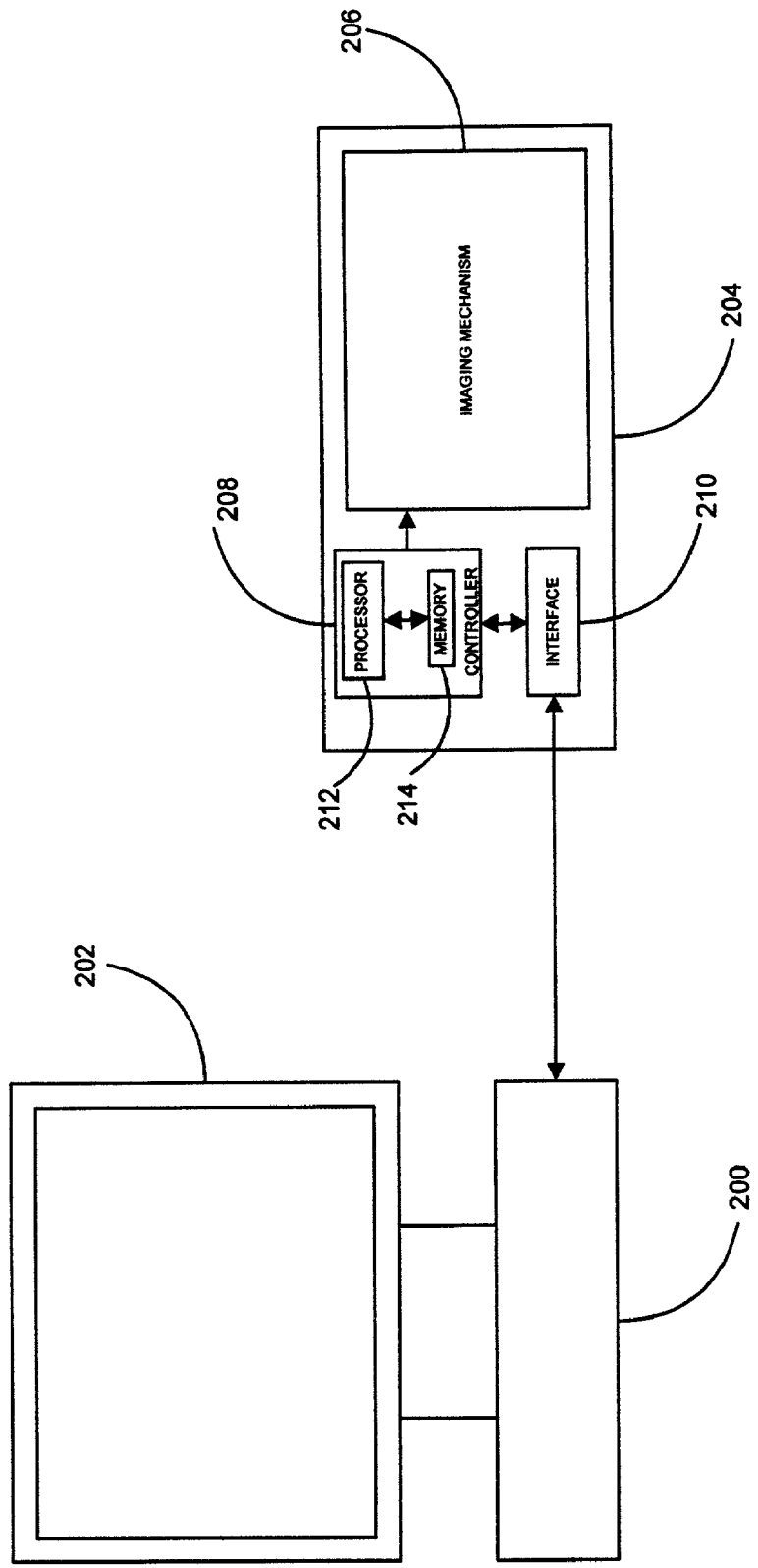
FIG. 2 shows a block diagram representation of a system used for forming images on media.

Shown in FIG. 2 is a block diagram representation of a system used for forming images on media 106. The system includes a computer 200. Computer 200 may execute an application program to generate data corresponding to an image displayed on monitor 202 (such as a CRT) or retrieve the data corresponding to the image from a storage device included within computer 200 through the application program. Typically, monitor 202 will display an image using an RGB color space and 24 bits (8 bits for each primary color) to specify the color value for each monitor pixel. An embodiment of an imaging device, printer 204 is coupled to computer 200. It should be recognized that although printer 204 is configured to perform the disclosed embodiments of the compression method, computer 200 and printer 204 could be configured so that an embodiment of the compression method is performed within computer 200.

Printer 204 may include color inkjet printer 100 or other types of printers such as electrophotographic printers. Printer 204 includes the capability to form color images upon media 106 in a binary fashion using a set of colorants (such as ink or toner) forming a color space (e.g. cyan, magenta, and yellow and optionally black). Printer 204 may be configured to form images at 300 dpi, 600 dpi, 1200 dpi, or other resolutions. A printer driver program that can execute in computer 200 converts the data (corresponding to the image) received from the application program into a form useable by printer 204, such as a page description language (PDL) file. The PDL file may include for example a file defined in HEWLETT PACKARD'S PCL-3 or PCL-5 format. Printer 204 renders the PDL file to generate pixel data including a color value for each pixel of each of the color planes forming the image. For example, an embodiment of printer 204 may generate color values for pixels forming the cyan, magenta, yellow, and black color planes. The color values for each of the pixels in the color planes may range, for example, from 0–255. A halftoning operation is performed upon the color values of the color planes to generate halftone data for the image. The halftone data includes binary data specifying for each of the pixels in each of the color planes whether colorant for that color plane will be placed onto the pixel. Using an embodiment of the compression method the halftone data is compressed and stored within printer 204. Subsequently, the compressed halftone data is decompressed and used by printer 204 in forming an image on the media 106.

Included in printer 204 is an embodiment of an imaging mechanism, imaging mechanism 206. Imaging mechanism 206 includes the hardware necessary to place colorant on media 106 using embodiments of the compression method. For example, in the case of an electrophotographic printer imaging mechanism 206 may include a photoconductor, developing devices for developing cyan, magenta, yellow, and black toner (the colorants in this embodiment of imaging mechanism 206), a photoconductor exposure system for forming a latent electrostatic image on the photoconductor, a charging device for charging the photoconductor, a transfer device for transferring toner from the photoconductor to media 106, and a fixing device for fixing toner to media 106.

An embodiment of a controller, such as controller 208, coupled to imaging mechanism 206 controls the placement of colorant on media 106 by imaging mechanism 206 making use of the compressed halftone data. The output from the printer driver software executing in computer 200 is passed through interface 210 to controller 208. Controller 208 may include an embodiment of a processing device, such as processor 212 configured to execute firmware, or an application specific integrated circuit (ASIC) for performing an embodiment of the compression method. In addition, controller 208 includes an embodiment of a memory device, such as memory 214. Further detail on embodiments of imaging mechanisms used in color electrophotographic imaging devices can be found in U.S. Pat. No. 5,291,251, entitled IMAGE DEVELOPMENT AND TRANSFER APPARATUS WHICH UTILIZED AN INTERMEDIATE TRANSFER FILM, issued to Storlie et. al., and assigned to Hewlett-Packard Company, and U.S. Pat. No. 5,314,774, entitled METHOD AND APPARATUS FOR DEVELOPING COLOR IMAGES USING DRY TONERS AND AN INTERMEDIATE TRANSFER MEMBER, issued to Camis, and assigned to Hewlett-Packard Company. Each of these two patents is incorporated by reference in their entirety into this specification.

In the case of a color inkjet printer, imaging mechanism 206 may include ink cartridges movably mounted on a carriage with its position precisely controlled by a belt driven by a stepper motor. An ink cartridge driver circuit coupled to the controller and the ink cartridges fires nozzles in the ink cartridges based upon signals received from the controller to place colorant on media 106 according to the decompressed halftone data. Further detail on embodiments of imaging mechanisms used in color inkjet printers can be found in U.S. Pat. No. 6,082,854, entitled MODULAR INK-JET HARD COPY APPARATUS AND METHODOLOGY, issued to Axtell et al., and assigned to Hewlett-Packard Company, and U.S. Pat. No. 5,399,039, entitled INK-JET PRINTER WITH PRECISE PRINT ZONE MEDIA CONTROL, issued to Giles et al., and assigned to Hewlett-Packard Company. Each of these two patents is incorporated by reference in their entirety into this specification.

Figure 3:
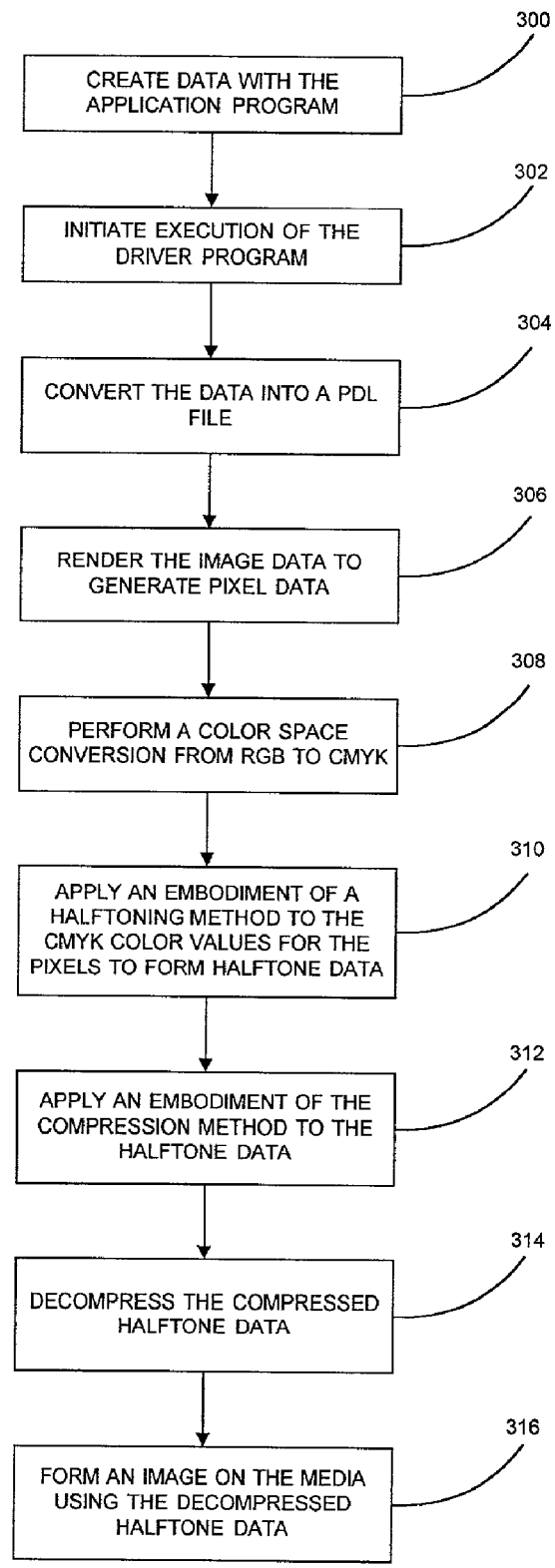
FIG. 3 shows a high level flow diagram of a method for forming an image on media using the system of FIG. 2.

Shown in FIG. 3 is a high level flow diagram of a method for forming an image on media using the system of FIG. 2. First, in step 300, a user creates data (or retrieves data) corresponding to an image on monitor 202 using the application program executing in computer 200. Next, in step 302, the user initiates execution of the printer driver program residing in computer 200 through the application program to begin the imaging operation. Then, in step 304, the driver program converts the data into a PDL file including image data useable by printer 204. The image data corresponds to the image on monitor 202 and is expressed in the RGB color space. Next, in step 306, the PDL file is rendered to generate pixel data for each pixel for the R, G, and B color planes. It should be recognized that the rendering operation may be performed in computer 200 or in printer 204. Then, in step 308, a color space conversion is performed to convert the color values for each pixel in the R. G, and B color planes into color values for each pixel in the C, M, Y, and K planes. Next, in step 310, an embodiment of a halftoning method is applied to the color values for the pixels in the C, M, Y, and K planes forming the image to generate halftone data. The halftone data indicates for every pixel in the image, in a binary fashion, whether each of the cyan, magenta, yellow, or black colorants are to be applied to the pixel. It should be recognized that the embodiment of the halftoning method could be performed within computer 200 or within controller 208. Next, in step 312, an embodiment of the compression method is applied to the halftone data to generate compressed halftone data that is stored in memory 214 included within controller 208. Next, in step 314, the compressed halftone data is retrieved from memory 214 and decompressed. Finally, in step 316, the image is formed on the media by printer 204 using the decompressed halftone data.

The embodiment of the halftoning method in step 310 of FIG. 3 may include an embodiment of a plane dependent fast error diffusion halftoning method, an embodiment of a tone dependent plane dependent error diffusion halftoning method, or an embodiment of a plane dependent matrix based halftoning method. It should be recognized that while embodiments of the compression method may achieve substantially improved compression ratios using halftone data generated using the previously mentioned halftoning methods, other halftoning methods may be used. Plane dependent fast error diffusion halftoning is disclosed in U.S. Pat. No. 5,949,965, assigned to the same entity as the subject patent application, and incorporated by reference in its entirety into this specification. Tone dependent plane dependent error diffusion halftoning is disclosed in a pending U.S. patent application having USPTO Ser. No. 09/307,064 assigned to the same entity as the subject patent application, and incorporated by reference in its entirety into this specification. Plane dependent matrix based halftoning is disclosed in a pending U.S. patent application having USPTO Ser. No. 09/678,642 assigned to the same entity as the subject patent application, and incorporated by reference in its entirety into this specification.

Shown in FIGS. 4–11 are grid patterns each representing the same portion of an image. FIGS. 4–11 are included for the purpose of explaining principles related to the operation of an embodiment of the compression method which will follow a brief description of each of the figures. Each of the small squares defined by the grids shown in FIGS. 4–11 corresponds to a pixel forming the portion of the image. Between the grids shown in FIGS. 4–11, squares in corresponding locations correspond to the same pixels forming the portion of the image. Although the FIGS. 4–11 correspond to the formation of an image using cyan, magenta, yellow, and black colorant, it should be recognized that the disclosed principles may be usefully applied in imaging devices making use of other combinations of colorants or display systems using other combinations of colors to display an image. Furthermore, although embodiments of the compression method are discussed in the context of partitioning the cyan color plane and the magenta color plane, it should be recognized that embodiments of the compression method could be usefully applied to other combinations of color planes, such as the black color plane and the yellow color plane, to achieve improved compression ratios.

Figure 4:
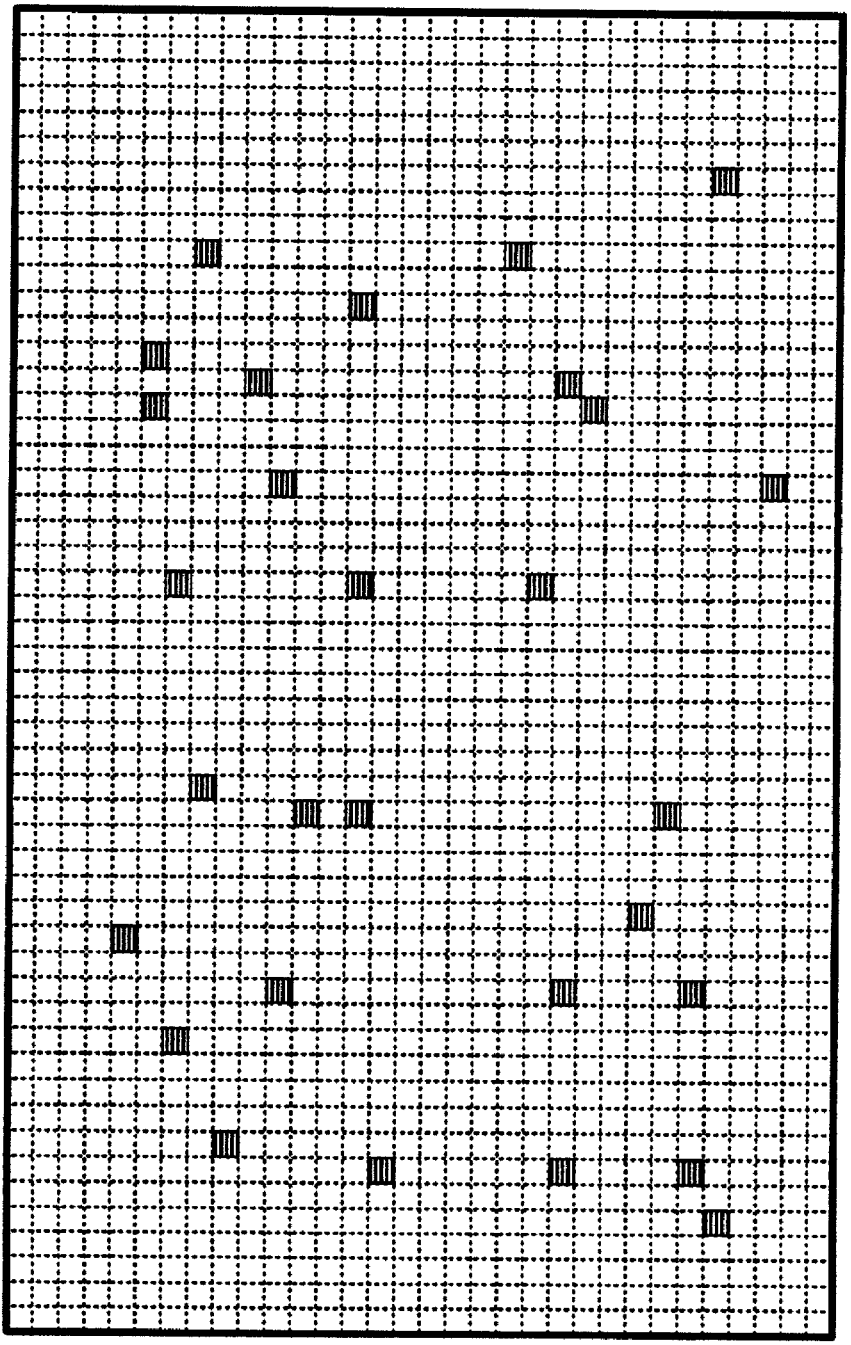
FIG. 4 shows pixel locations on which cyan colorant is to be placed within a portion of an image.
Figure 5:
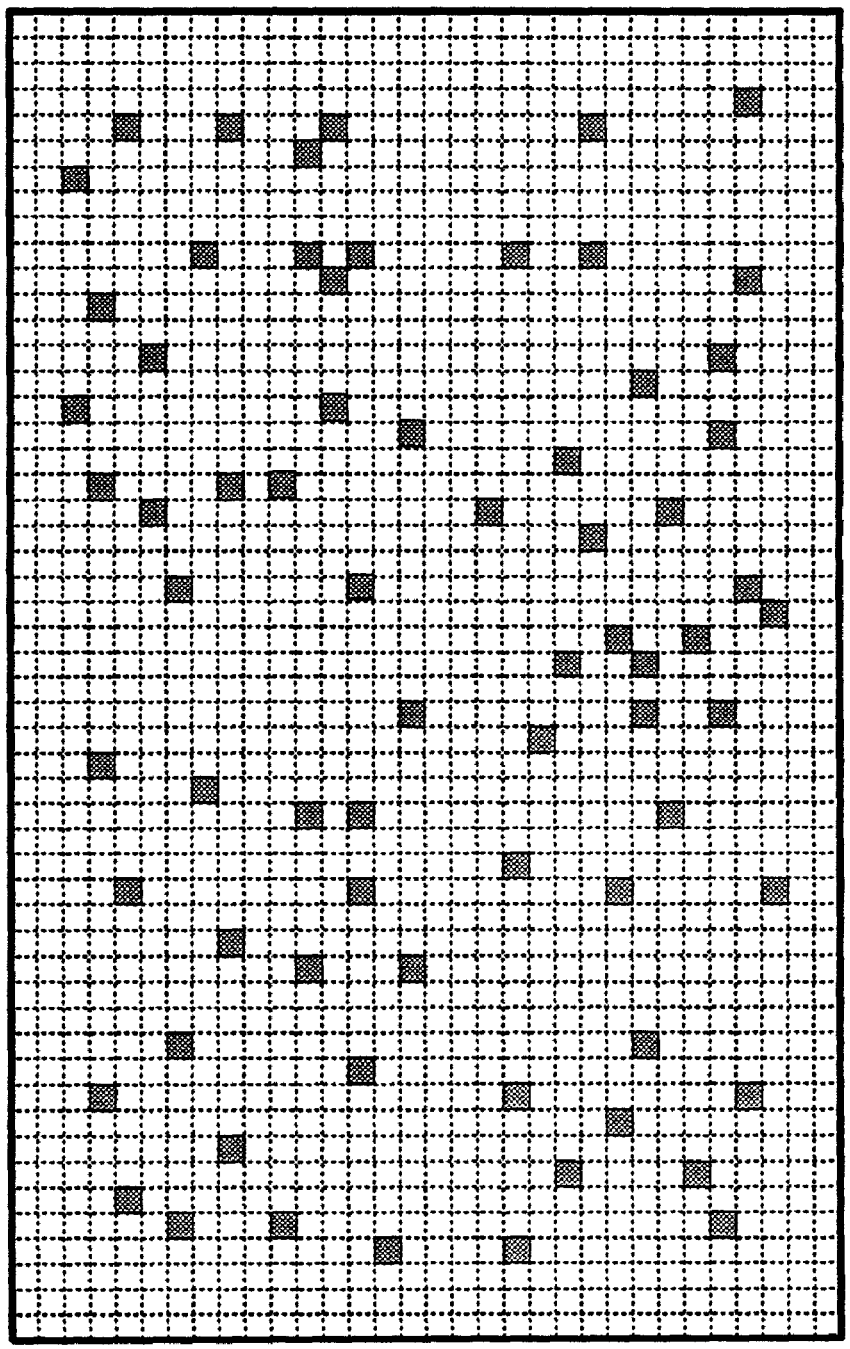
FIG. 5 shows pixel locations on which magenta colorant is to be placed within the portion of the image.
Figure 6:
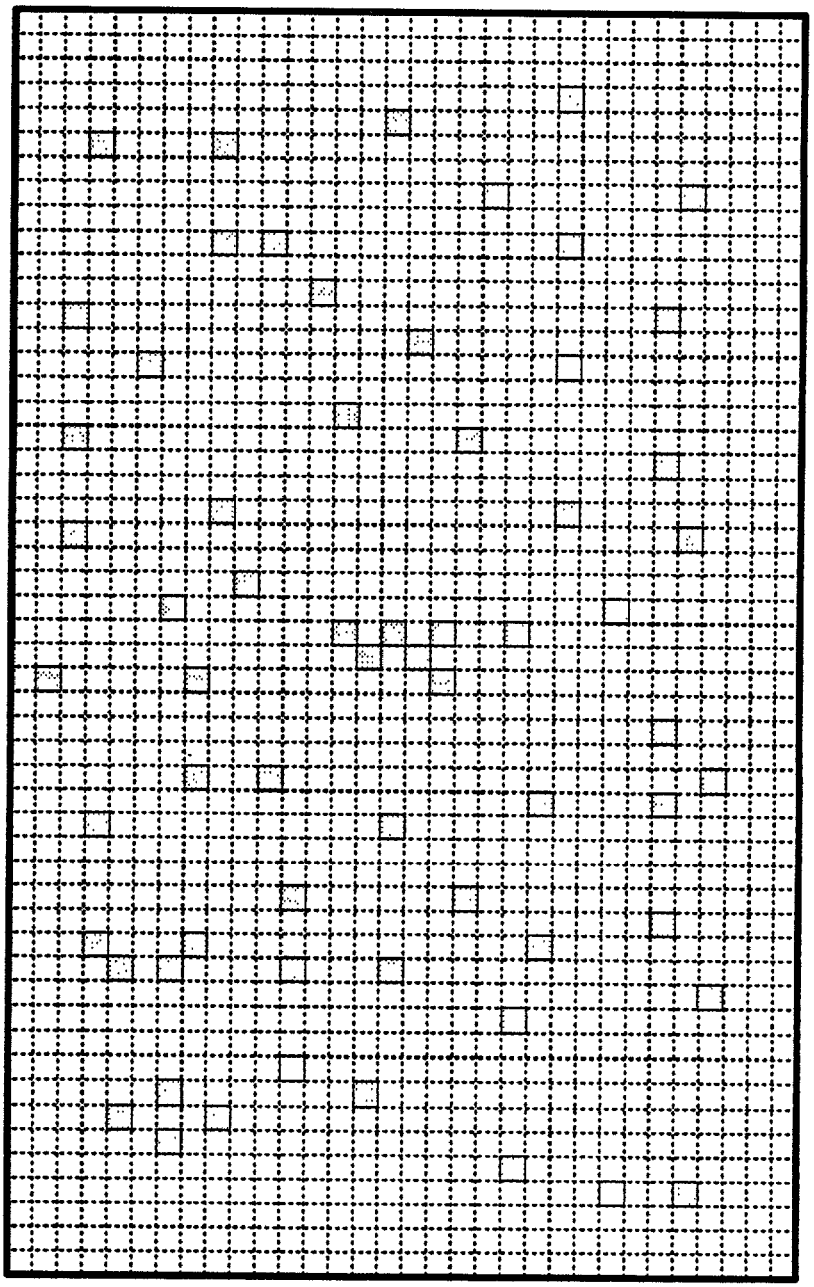
FIG. 6 shows pixel locations on which yellow colorant is to be placed within the portion of the image.
Figure 7:
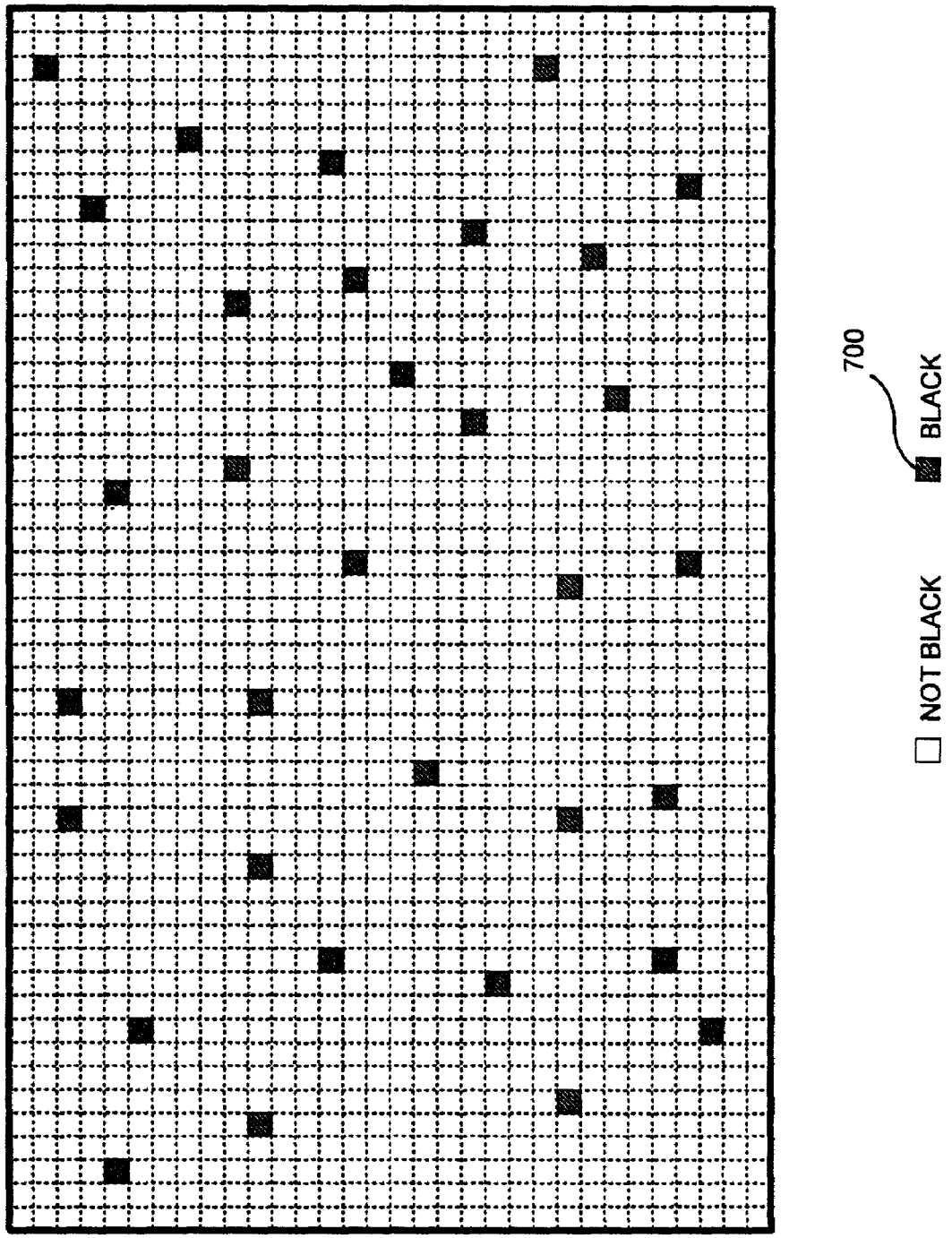
FIG. 7 shows pixel locations on which black colorant is to be placed within the portion of the image.

Shown in FIG. 4 is the placement of cyan colorant 400 onto pixels forming the portion of the image. The placement of cyan colorant 400 on the portion of the image shown in FIG. 4 is determined by the application of an embodiment of a halftoning method operating upon the color values of the pixels forming the portion of the image for the cyan color plane. The halftoning operation generates a bit map including a single bit for each pixel forming the cyan color plane. The value of the bit indicates whether or not cyan colorant 400 will be placed onto the pixel. Those pixels of the portion of the image shown in FIG. 4 having the fill pattern for cyan colorant 400 correspond to pixels for which the cyan color plane bit map indicates that cyan colorant 400 will be placed onto the pixel. The remaining pixels (having no cyan colorant 400 placed onto them) have no fill pattern. Similarly, FIGS. 5–7 show the placement of, respectively, the magenta 500, yellow 600, and black colorant 700 onto the pixels forming the portion of the image for, respectively, the magenta, yellow, and black color planes. The generation of the bit maps from the halftoning operation specifying which of the pixels will receive the respective colorant for the magenta, yellow, and black color planes is done in a manner similar to the cyan color plane. In FIGS. 4–7, those pixels onto which the colorant of the particular color plane will not be placed have no fill pattern.

Figure 8:
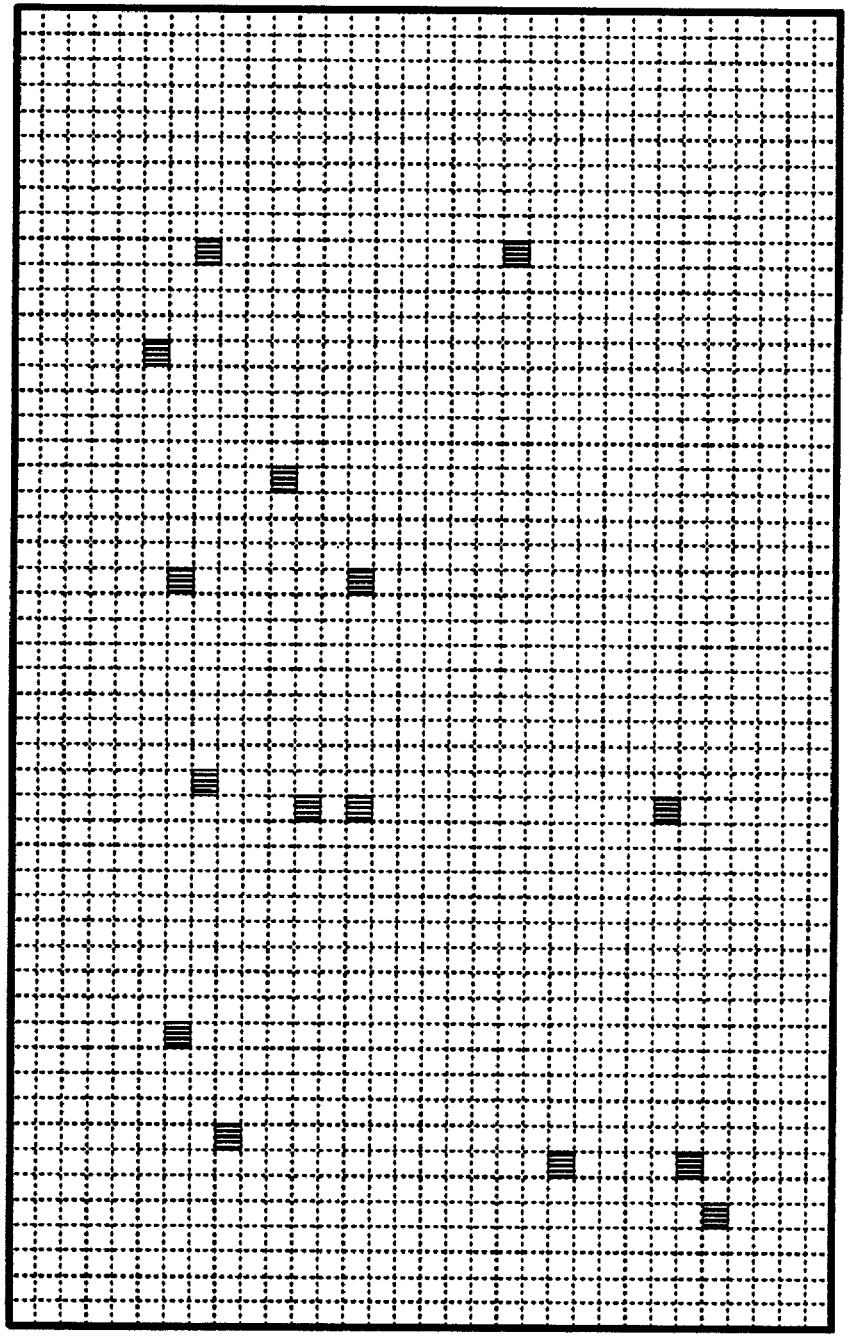
FIG. 8 shows pixel locations on which both cyan colorant and magenta colorant are to be placed within the portion of the image to form the blue plane.
Figure 9:
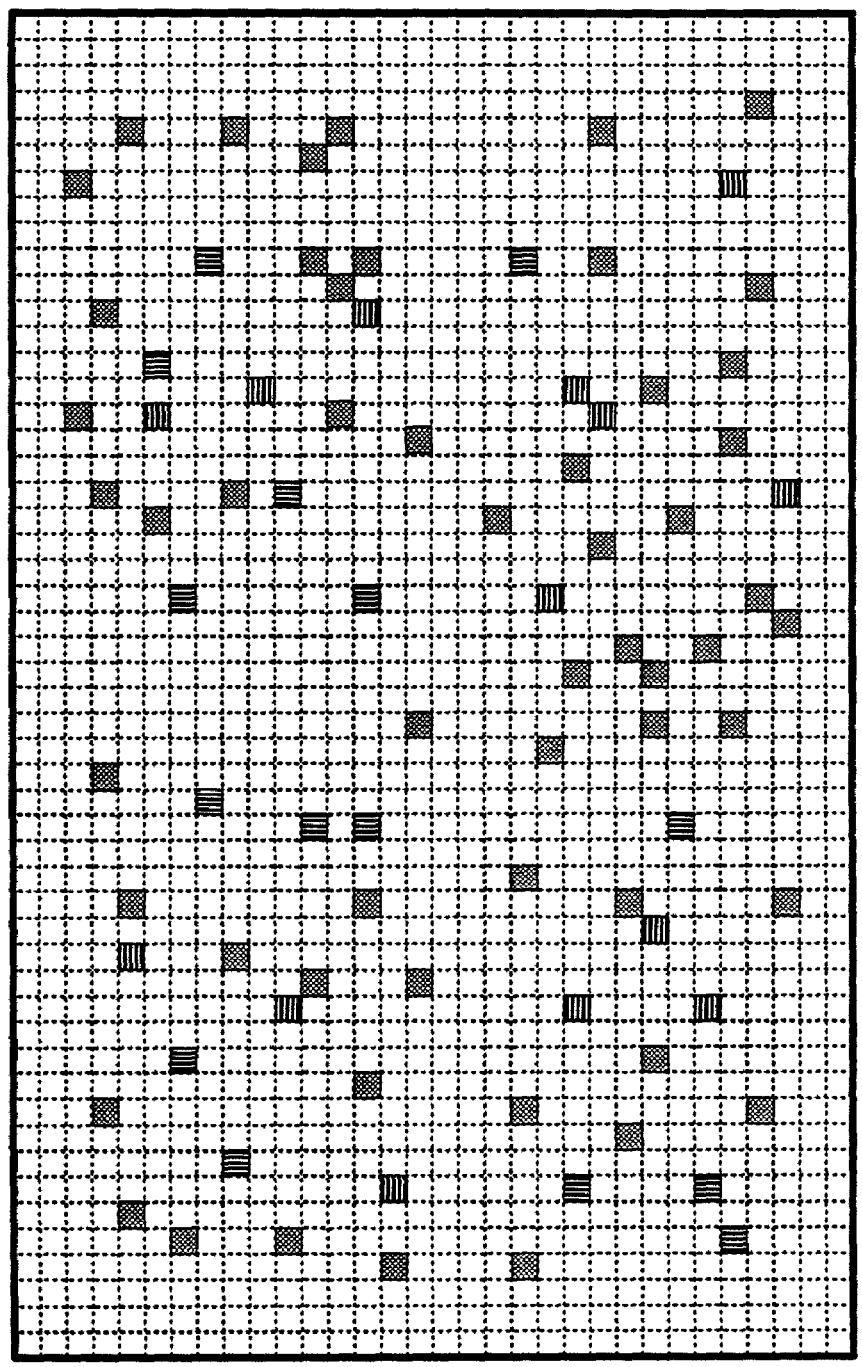
FIG. 9 shows pixel locations on which either or both cyan colorant and magnet colorant are to be placed within the portion of the image.
Figure 10:
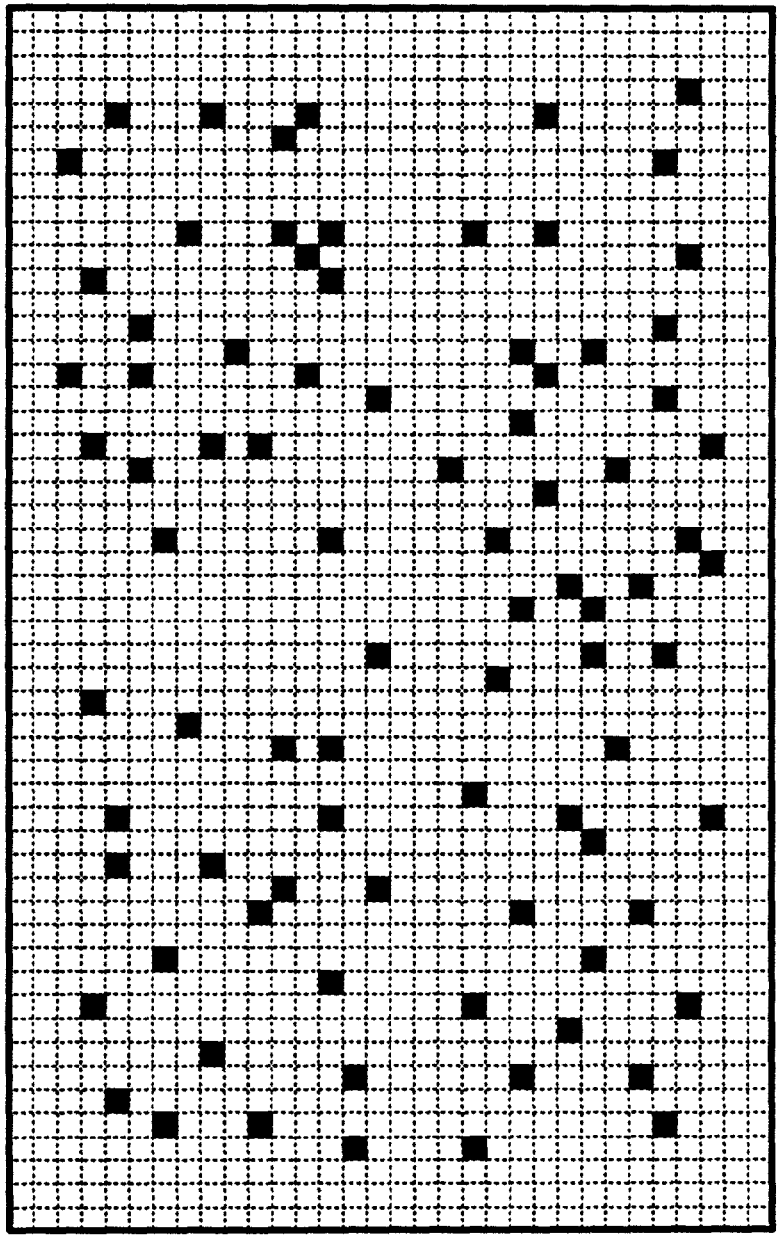
FIG. 10 shows pixel locations on which either or both cyan colorant and magenta colorant are to be placed within the portion of the image to form the white plane.
Figure 11:
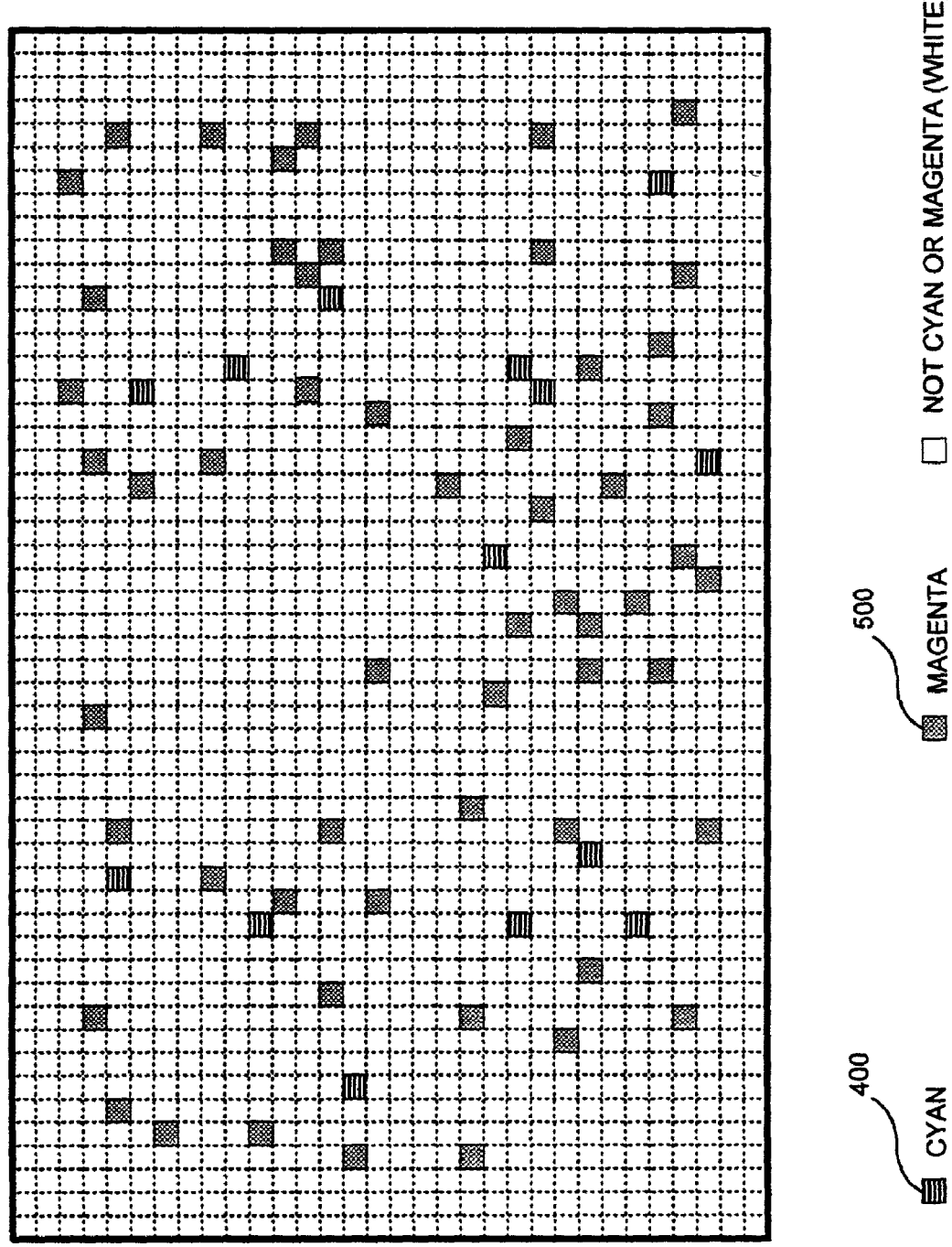
FIG. 11 shows pixel locations on which either cyan colorant or magenta colorant are to be placed within the portion of the image to form the cyan/magenta plane.

Blue is formed from cyan colorant 400 and magenta colorant 500 deposited in substantially equal quantities onto a pixel. Shown in FIG. 8 is distribution of blue pixels designated by fill pattern 800 for blue. Those pixels in FIG. 8 that are not blue have no fill pattern. Shown in FIG. 9 is a composite of the portion of the image for the cyan and magenta color planes. Those pixels for which cyan colorant 400 and magenta colorant 500 overlap form a blue color on the pixel and are shaded with fill pattern 800. Those pixels on which neither cyan colorant 400 nor magenta colorant 500 are placed have no fill pattern. Shown in FIG. 10 is an alternative representation of the information shown in FIG. 9. In FIG. 10, those pixels on which either or both of cyan colorant 400 or magenta colorant 500 are to be placed are designated as nonwhite pixels and are covered with fill pattern 1000. Those pixels on which neither cyan colorant 400 or magenta colorant 500 are to be placed are designated as white pixels and have no fill pattern. Shown in FIG. 11 is a representation of those pixels forming the portion of the image for which either, but not both, of cyan colorant 400 or magenta colorant 500 are to be placed. Those pixels on which neither cyan colorant 400 or magenta colorant 500 are placed are designated as white and have no fill pattern.

An embodiment of the compression method utilizes halftone bit maps related to FIGS. 8–11 to generate compressed halftone data for the information included within the cyan and magenta color planes. The halftone bit maps corresponding to the yellow and black color planes are compressed separately from the cyan and magenta color planes in this embodiment of the compression method. Those pixels designated as white for the embodiment of the compression method may actually have yellow colorant 600 or black colorant 700 deposited onto them. In the embodiment of the compression method, the two bits maps corresponding to the cyan color plane and the magenta color plane are partitioned to form a blue/(not blue) color plane, a white/(not white) color plane and a cyan or magenta color plane. In forming the blue/(not blue) color plane, the white/(not white) color plane, and the cyan or magenta color plane, some pixels in some of the color planes are not encoded. These three color planes are then compressed. The compression ratio achieved by partitioning and compressing the cyan color plane and magenta color plane in this manner is usually greater than the compression ratio that would be achieved by compressing the cyan color plane and the magenta color plane singly. The improvement in the compression ratio realized from this partition of the cyan and magenta color planes into three color planes comes about because the three resulting color planes include greater redundancy in the information (and consequently greater compression efficiency) than the magenta color plane and the cyan color plane.

A variety of compression techniques may be used to compress the partitioned cyan and magenta color planes. For example JBIG compression may be used to compress the partitioned color planes. One compression technique that works particularly well for compression of the partitioned cyan and magenta color planes is run length encoding. Although many existing lossy compression techniques would result in poor image quality if used with the disclosed methods of partitioning the cyan and magenta color planes, it should be recognized that lossy compression techniques that would perform acceptably well may be developed in the future.

Run length encoding is a compression technique that is relatively easily implemented. Consider an image formed from a two dimensional array of pixels each having a corresponding single bit binary value, as is the case for a halftoned color plane, for each color plane forming the image. Run length encoding includes partitioning the array, row by row, into sections of consecutive pixels having the same associated binary value. A code is generated for each section representing the number of consecutive pixels having the same associated binary value. The code can be selected so that the codes for the most frequently occurring numbers of consecutive pixels having the same associated binary value use the smallest number of bits. Knowing the binary value associated with the first pixel in each row is sufficient to identify the binary value associated with each section because the binary value associated with consecutive sections alternates. Further information regarding implementations of run length encoding can be found in U.S. Pat. Nos. 3,925,780, 3,813,485, and 6,246,800, each of which is incorporated by reference in its entirety into this specification.

As previously mentioned, the bit maps resulting from the partition of the cyan and magenta color planes consist of a blue/(not blue) bit map, a white/(not white) bit map and a cyan or magenta bit map. Because of the redundancy between the bit maps of these three color planes, not all of the single bit binary values associated with the pixels forming the color planes need to be encoded. The blue/(not blue) bit map fully specifies the presence and location of those pixels in the color plane on which both cyan colorant 400 and magenta colorant 500 will be placed. The blue/(not blue) bit map is encoded as a two dimensional array of bits, with the bits that are set to a logic one corresponding to blue pixels and the bits that are set to a logic zero corresponding to not blue pixels. The position of the pixels in the image is specified by the position of the bits in the array.

The values corresponding to the pixels in the white/(not white) color plane that are blue do not need to be encoded when forming the white/not white color plane. Similarly, the values corresponding to the pixels in the cyan or magenta color plane that are blue or white do not need to be encoded when forming the cyan or magenta color plane. The not white pixels in the white/(not white) color plane correspond to pixels that are either cyan or magenta. The blue pixels are not encoded into the white/not white color plane. The pixels encoded for the white/(not white) bit map are those that are either white, cyan, or magenta. The white/(not white) color plane is encoded as a single dimension array of bits, with the bits that are set to a logic one corresponding to white pixels and the bits that are set to a logic zero corresponding to pixels onto which either cyan colorant 400 or magenta colorant 500 will be placed. As will be explained more fully later in the specification, the position of the white pixels is derived from the position information in the blue/(not blue) color plane. The effect of not encoding the blue pixels in the white/not white color plane is, generally, to increase the run length of white pixels and non-white pixels thereby improving the compression ratio.

For the cyan or magenta plane, the values that correspond to blue or white pixels are not encoded. The cyan or magenta color plane is encoded as a single dimension array of bits, with the bits that are set to a logic one corresponding to pixels onto which magenta colorant 500 will be placed and bits that are set to a logic zero corresponding to pixels onto which cyan colorant 400 will be placed. As was the case for the white/not white color plane, the run length of cyan and magenta pixels is generally increased by not encoding the white or blue pixels.

The three bit maps resulting from the partitioning of the cyan color plane and the magenta color plane, in their reduced form, are independently compressed using a run length encoding technique. Reducing the amount of data in the white/(not white) bit map and the cyan or magenta bit typically increases the run length thereby generally increasing the compression ratio.

Figure 12A:
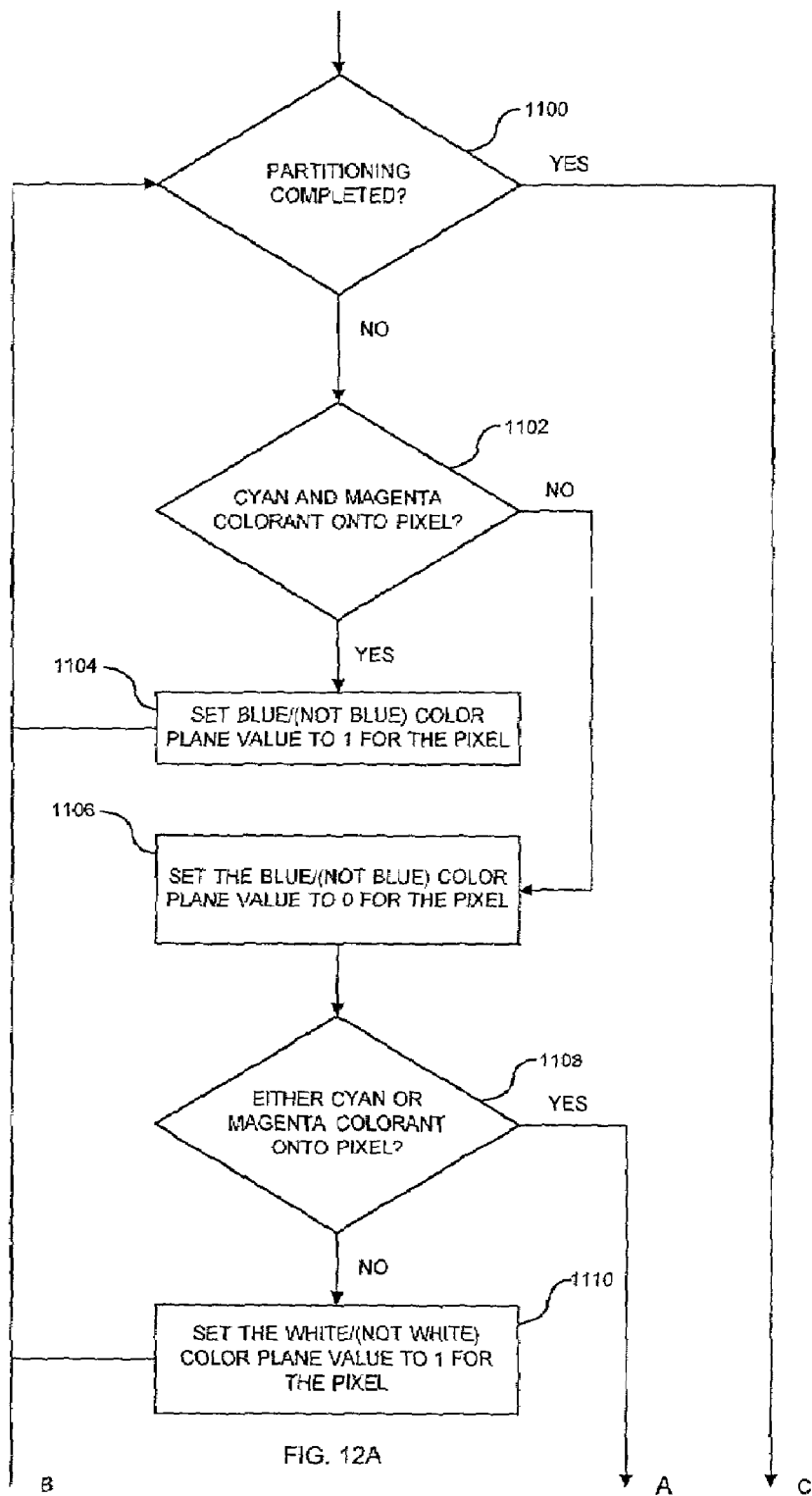
FIG. 12A and FIG. 12B show a high level flow diagram describing the operation of an embodiment of a compression method.
Figure 12B:
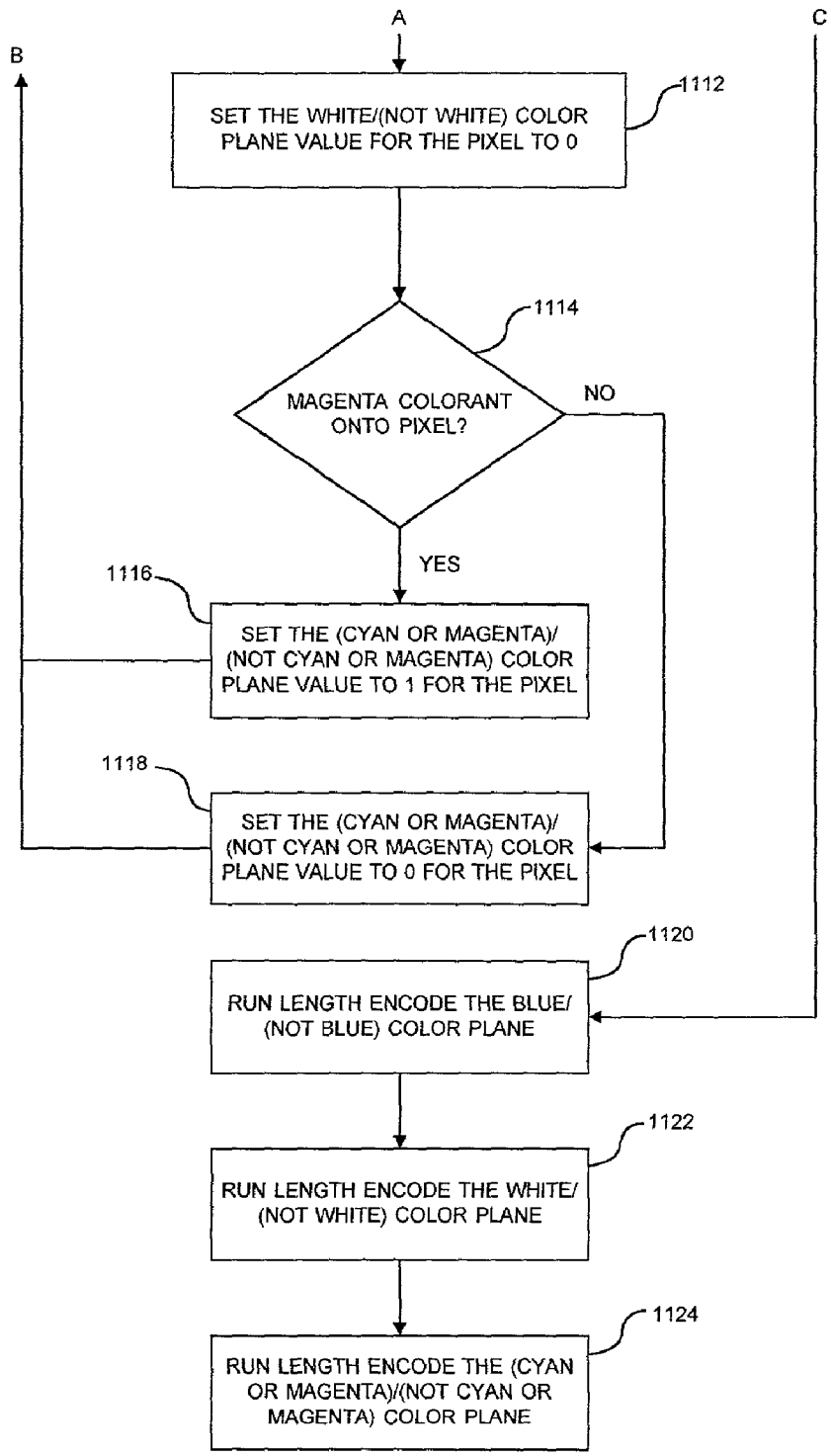

Shown in FIG. 12A and FIG. 12B is a high level flow diagram of an embodiment of a compression method. The method shown in FIG. 12A and FIG. 12B is applied to each pixel of the cyan and magenta color plane. First, in step 1100, it is determined if all the pixels in the cyan and magenta color planes have been partitioned. If all the pixels have been partitioned, control is transferred to step 1120. If all of the pixels have not been partitioned, next, in step 1102, it is determined if selected corresponding pixels in the cyan color plane and the magenta color plane are to have both cyan and magenta colorant placed onto the pixel to generate an entry for the corresponding pixel in the blue/(not blue) color plane. If both cyan and magenta colorant are to be placed on the pixel, then, in step 1104, an entry is made into the corresponding pixel of the blue/(not blue) color plane by setting the value for the blue pixel to 1. Then, control is returned to step 1100 to partition the next pixel in the cyan and magenta color planes. By returning control to step 1100 after setting the value for the blue pixel, the blue pixels are effectively depleted from the white/(nonwhite) color plane and the cyan or magenta color plane. The white/(not white) color plane is effectively depleted of blue pixels because the blue pixels are not encoded during its formation.

If both cyan and magenta colorant are not to be placed on the pixel, then, in step 1106, an entry is made for the corresponding pixel of the blue/(not blue) color plane by setting the value for the not blue pixel to 0. Next, in step 1108 it is determined if either cyan or magenta colorant is to be placed onto the pixel. If neither cyan or magenta colorant is to be placed onto the pixel, then, in step 1110, an entry is made for the corresponding pixel of the white/(not white) plane by setting the value for the white pixel to 1. Then, control is returned to step 1100 to partition the next pixel in the cyan and magenta color planes.

If either cyan or magenta colorant are to be placed onto the pixel, then in step 1112, the value for the corresponding pixel in the white/(not white) color plane is set to 0. Next, in step 1114, it is determined if magenta colorant is to be placed onto the pixel. If magenta colorant is to be placed onto the pixel, then, in step 1116, an entry is made for the corresponding pixel of the cyan or magenta color plane by setting the value for the pixel to 1. Then, control is returned to step 1100 to partition the next pixel in the cyan and magenta color plane.

If magenta colorant is not to be placed onto the pixel, then cyan colorant will be placed onto the pixel. In step 1118, an entry is made for the corresponding pixel of the cyan or magenta color plane by setting the value for the pixel to 0 indicating that cyan colorant is to be placed onto the pixel. Then, control is returned to step 1100 to partition the next pixel in the cyan and magenta color plane. Because the values entered for each of the pixels in the cyan or magenta color plane correspond to either a pixel upon which one or the other of cyan colorant or magenta colorant will be placed, white pixels and blue pixels are depleted from the cyan or magenta color plane. Therefore, the cyan or magenta color plane is effectively depleted by not encoding white pixels and blue pixels in the formation of the cyan or magenta color plane.

After completion of the partition of the cyan and magenta color planes, control is transferred to step 1120. In step 1120, the blue/(not blue) color plane is run length encoded. Next, in step 1122, the white/(not white) color plane is encoded. Finally, in step 1124, the cyan or magenta color plane is encoded. Shown in FIG. 13 is pseudo code implementing the method disclosed in FIG. 12A and FIG. 12B.

For decompression, each of the compressed blue/(not blue) color plane, the white/(not white) color plane, and the cyan or magenta color plane are expanded using the run length encoded information generated during compression. Next, the cyan color plane and magenta color plane are recreated using the two dimensional blue/(not blue) array, the single dimensional white/(not white) array, and the single dimensional cyan or magenta array. To recreate the cyan and magenta color plane, each value in the blue/(not blue) array is sequentially examined in the same order used to form the blue/(not blue) array. If the value is a logic one, then a logic one is stored in the corresponding location of the magenta bit map and the cyan bit map because the value corresponds to a blue pixel.

If the value in the blue/(not blue) array is a logic zero, then it is known that the pixel is either white, cyan, or magenta. To determine if the pixel is white, the next value in the white/(not white) array is examined. If the value in the white/(not white) array is a logic one, then a logic zero is stored in the corresponding location of the magenta bit map and the cyan bit map for a white pixel. However, if the value in the white/(not white) array is a logic zero, then it is known that the pixel is either cyan or magenta. To determine whether the pixel is cyan or magenta, the next value in the cyan or magenta array is examined. If the value in the cyan or magenta array is a logic one, then the pixel is magenta and a logic one is stored in the corresponding location of the magenta bit map and a logic zero is stored in the corresponding location of the cyan bit map. If the value in the cyan or magenta array is a logic zero, then the pixel is cyan and a logic zero is stored in the corresponding location of the magenta bit map and a logic one is stored in the corresponding location of the cyan bit map.

The location for the white pixels encoded in the white/(not white) array and for the cyan or magenta pixels encoded in the cyan or magenta array is derived from the location information encoded into the blue/(not blue array). When the white/(not white) array and the cyan or magenta array are formed, the values in the cyan bit map and the magenta bit map are processed in a predetermined sequence. A variety of predetermined sequences could be used. For example, the cyan bit map and the magenta bit map could be processed across the width of the image, line by line down the length of the image. Because a definite sequence of processing is followed through the cyan bit map and the magenta bit map, the resulting blue/(not blue) array, white/(not white) array, and cyan or magenta array are filled in the same sequence. Therefore, if the same predetermined sequence is followed in recreating the cyan bit map and the magenta bit map, the white pixels, the cyan pixels, and the magenta pixels will be placed at the proper locations within the cyan bit map and the magenta bit map.

Shown in FIG. 14 are results from applying the compression method disclosed in FIG. 12A, 12B, and FIG. 13 to a variety of files including images. For the sample files used, the reduction in the size of the halftone bit maps ranges from 28% to 42%.

Figure 15:
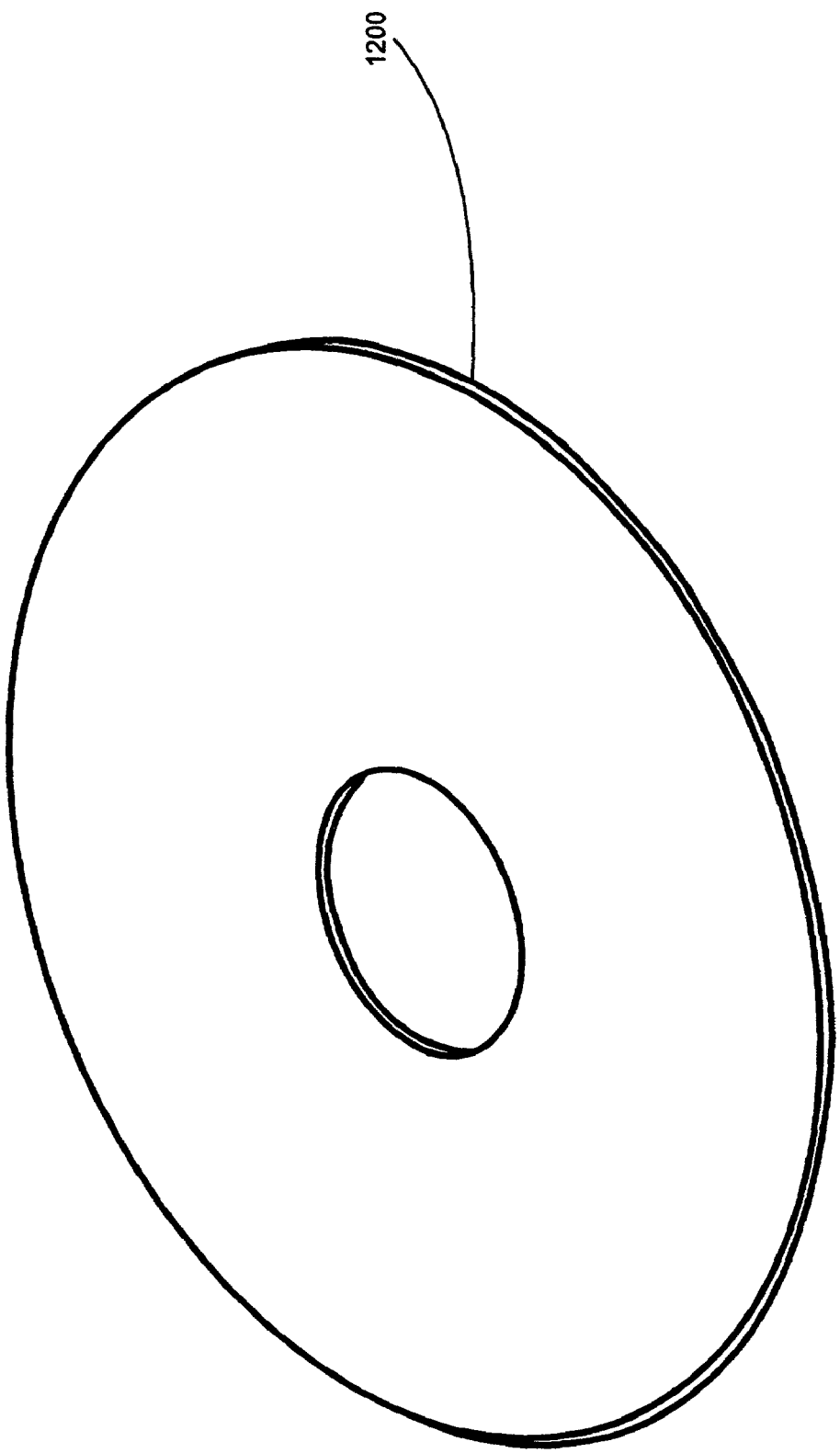
FIG. 15 shows an embodiment of a computer readable medium.

Shown in FIG. 15 is an embodiment of a computer readable medium, such as a compact disk 1200, on which code for an embodiment of the compression method could be stored. Embodiments of the compression method could be distributed to users on the compact disks or floppy disks for installation onto the hard disk drive in a computer, such as computer 200. Alternatively, embodiments of the compression method could be distributed through a network to computer 200 or to a network enabled imaging device.

Although an embodiment of the compression method has been illustrated, and described, it is readily apparent to those of ordinary skill in the art that various modifications may be made to this embodiment without departing from the scope of the appended claims.

What is claimed is:

1. A method for compression, comprising:
forming a third color plane, indicating whether a first colorant and a second colorant will be placed on ones of a plurality of pixels, a fourth color plane, indicating whether neither of the first colorant or the second colorant will be placed on the ones of the plurality of pixels, and a fifth color plane, indicating whether one of the first colorant and the second colorant will be placed on the ones of the plurality of pixels, from a first color plane and a second color plane; and
performing the compression on the third color plane, the fourth color plane, and the fifth color plane.

2. The method as recited in claim 1 wherein:
forming includes determining if a first halftone data value, included within the first color plane, indicates placement of the first colorant onto one of the plurality of pixels;
determining if a second halftone data value, included within the second color plane, indicates placement of the second colorant on the one of the plurality of pixels;
setting an element in a first array, corresponding to the third color plane, to a first value where placement of the first colorant and the second colorant on the one of the plurality of pixels will be done;
setting the element in the first array to a second value where placement of fewer than the first colorant and the second colorant on the one of the plurality of pixels will be done;
setting an element in a second array, corresponding to the fourth halftone color plane, to the first value where placement of neither the first colorant or the second colorant on the one of the plurality of pixels will be done;
setting the element in the second array to the second value where placement of either the first colorant or the second colorant on the one of the plurality of pixels will be done;
setting an element in a third array, corresponding to the fifth halftone color plane, to the first value where placement of the first colorant on the one of the plurality of pixels without placement of the second colorant on the one of the plurality of pixels will be done; and
setting the element in the third array to the second value where placement of the second colorant on the one of the plurality of pixels without placement of the first colorant on the one of the plurality of pixels will be done.

3. The method as recited in claim 2, wherein:
the first color plane includes a cyan color plane; and
the second color plane includes a magenta halftone color plane.

4. The method as recited in claim 3, wherein:
the first colorant includes cyan colorant and the second colorant includes magenta colorant.

5. The method as recited in claim 3, further comprising:
performing a halftone operation to generate the cyan color plane and to generate the magenta color plane.

6. The method as recited in claim 5, wherein:
the halftone operation includes a plane dependent matrix based halftoning operation.

7. The method as recited in claim 1, wherein:
the performing the compression includes performing a run length encoding.

8. The method as recited in claim 1, wherein:
the performing the compression includes performing JBIG encoding.

9. An apparatus to perform a compression, comprising:
a processing device configured to form a third color plane, indicating whether a first colorant and a second colorant will be placed on ones of a plurality of pixels, a fourth color plane, indicating whether neither of the first colorant or the second colorant will be placed on the ones of the plurality of pixels, and a fifth color plane, indicating whether one of the first colorant and the second colorant will be placed on the ones of the plurality of pixels, from a first color plane and a second color plane and configured to perform the compression on the third color plane, the fourth color plane, and the fifth color plane to generate compressed data and to decompress the compressed data to generate decompressed data; and a memory configured to store the compressed and the decompressed data.

10. The apparatus as recited in claim 9, wherein:

the first color plane corresponds to a cyan color plane; and the second color plane corresponds to a magenta color plane.

11. The apparatus as recited in claim 9, wherein:

the compression includes run length encoding.

12. The apparatus as recited in claim 11, wherein:

the processing device includes a processor configured to execute a first set of instructions to form the third, the fourth, and the fifth color plane from the cyan color plane and the magenta color plane and configured to execute a second set of instructions to perform the run length encoding.

13. The apparatus as recited in claim 11, wherein:

the processing device includes an ASIC configured to form the third, the fourth, and the fifth color plane from the cyan color plane and the magenta color plane and configured to perform the run length encoding.

14. An imaging device, comprising:

a processing device configured to form a third halftone color plane, indicating whether a first colorant and a second colorant will be placed on ones of a plurality of pixels, a fourth halftone color plane, indicating whether neither of the first colorant or the second colorant will be placed on the ones of the plurality of pixels, and a fifth halftone color plane, indicating whether one of the first colorant and the second colorant will be placed on the ones of the plurality of pixels, from a first halftone color plane and a second halftone color plane and configured to perform a compression on the third halftone color plane, the fourth halftone color plane, and the fifth halftone color plane to generate compressed halftone data and to decompress the compressed halftone data to generate decompressed halftone data;

a memory configured to store the compressed and the decompressed halftone data; and an imaging mechanism configured to place colorant on media according to the decompressed halftone data.

15. The imaging device as recited in claim 14, wherein:

the first halftone color plane corresponds to a cyan halftone color plane; and the second halftone color plane corresponds to a magenta halftone color plane.

16. The imaging device as recited in claim 15, wherein:

the processing device includes a configuration to form the third, the fourth, and the fifth halftone color plane by determining if a plurality of cyan halftone data values, included within the cyan halftone color plane, indicate placement of the cyan colorant on the ones of the plurality of pixels;

by determining if a plurality of magenta halftone data values, included within the magenta halftone color plane, indicate placement of magenta colorant on the ones of plurality of pixels;

by setting a plurality of elements in a first array, corresponding to the third halftone color plane, to a first value for those of the ones of the plurality of pixels designated for placement of the cyan colorant and the magenta colorant;

by setting the plurality of elements in the first array to a second value for those of the ones of the plurality of pixels designated for placement of fewer than the cyan colorant and the magenta colorant;

by setting a plurality of elements in a second array, corresponding to the fourth halftone color plane, to the first value for those of the ones of the plurality of pixels designated for placement of neither the cyan colorant or the magenta colorant;

by setting the plurality of elements in the second array to the second value for those of the ones of the plurality of pixels designated for placement of either the cyan colorant or the magenta colorant;

by setting a plurality of elements in a third array, corresponding to the fifth halftone color plane, to the first value for those of the ones of the plurality of pixels designated for placement of the cyan colorant without placement of the magenta colorant; and by setting the plurality of elements in the third array to the second value for those of the ones of the plurality of pixels designated for placement of the magenta colorant without placement of the cyan colorant.

17. An inkjet printer, comprising:

a processor configured to form a blue halftone color plane, a white halftone color plane, and a cyan-magenta halftone color plane from a cyan halftone color plane and a magenta halftone color plane and configured to perform a run length encoding of the blue, white, and cyan-magenta color plane to generate compressed halftone data and to decompress the compressed halftone data to generate decompressed halftone data;

a memory configured to store the compressed and the decompressed halftone data; and an imaging mechanism configured to place cyan ink and magenta ink onto media according to the decompressed halftone data.

18. The inkjet printer as recited in claim 17, wherein:

the processor includes a configuration to form the blue, the white, and the cyan-magenta color plane by determining if a plurality of cyan halftone data values, included within the cyan halftone color plane, indicate placement of the cyan colorant onto a plurality of pixels corresponding to the cyan halftone data values;

by determining if a plurality of magenta halftone data values, included within the magenta halftone color plane, indicate placement of the magenta colorant onto the plurality of pixels corresponding to the magenta halftone values;

by setting a plurality of elements in a first array, corresponding to the blue halftone color plane, to a first value for placement of the cyan and the magenta colorant onto ones of the plurality of pixels;

by setting the plurality of elements in the first array to a second value for placement of fewer than the cyan and the magenta colorant onto ones of the plurality of pixels;

by setting a plurality of elements in a second array, corresponding to the white halftone color plane, to the first value for placement of neither the cyan or the magenta colorant onto ones of the plurality of pixels;

by setting the plurality of elements in the second array to the second value for placement of either the cyan or the magenta colorant onto ones of the plurality of pixels;

by setting a plurality of elements in a third array, corresponding to the cyan-magenta halftone color plane, to the first value for placement of only the cyan colorant onto ones of plurality of pixels; and by setting the plurality of elements in the third array to the second value for placement of only the magenta colorant onto ones of the plurality of pixels.

19. A computer readable medium to store instructions to perform a compression, comprising:

processor executable instructions stored on the computer readable medium, with the processor executable instructions configured to form a third halftone color plane a fourth halftone color plane and a fifth halftone color plane from a first halftone color plane and a second halftone color plane and configured to perform the compression on the third halftone color plane, the fourth halftone color plane, and the fifth halftone color plane.

20. The computer readable medium of claim 19, wherein:

the first halftone color plane includes a cyan halftone color plane, the second halftone color plane includes a magenta halftone color plane, the third halftone color plane includes pixels for placement of cyan colorant and magenta colorant, the fourth halftone color plane includes pixels for which no colorant will be place, and the fifth halftone color plane includes pixels for placement of either the cyan colorant or the magenta colorant.

21. The computer readable medium recited in claim 20, wherein: the compression includes run length coding.

22. A method for determining values in arrays used in compression, comprising:

determining if a first halftone data value indicates placement of a first colorant onto a pixel;

determining if a second halftone data value indicates placement of a second colorant onto the pixel;

setting an element in a first array to a first value for placement of the first and the second colorant onto the pixel;

setting the element in the first array to a second value for placement of fewer than the first and the second colorant onto the pixel;

setting an element in a second array to the first value for placement of neither the first or the second colorant onto the pixel;

setting the element in the second array to the second value for placement of either the first or the second colorant onto the pixel;

setting an element in a third array to the first value for placement of only the first colorant onto the pixel; and setting the element in the third array to the second value for placement of only the second colorant onto the pixel.

23. The method as recited in claim 22, further comprising:

repeating determining the placement of the first and the second colorant and setting the element in the first, second, and third array for a plurality of pixels forming an image.

24. The method as recited in claim 23, further comprising:

run length encoding the first array, the second array, and the third array.

25. The method as recited in claim 23, wherein:

the first colorant corresponds to cyan; and the second colorant corresponds to magenta.

26. A method for determining values in arrays used in compression, comprising:

setting a first halftone array element and a second halftone array element to a first value if a first array element equals a third value;

setting the first halftone array element and the second halftone array element to a second value if a second array element equals the third value;

setting the first halftone array element to the first value and the second halftone array element to the second value if a third array element equals the third value; and setting the first halftone array element to the second value and the second halftone array element to the first value if the third array element equals a fourth value.

27. The method as recited in claim 26, wherein:

a cyan color plane includes the first halftone array element;

a magenta color plane includes the second halftone array element.

28. The method as recited in claim 27, wherein:

a blue color plane includes the first array element;

a white color plane includes the second array element; and a cyan or magenta color plane includes the third array element.

29. The method as recited in claim 28, further comprising:

decompressing a run length encoded blue color plane to generate the blue color plane;

decompressing a run length encoded white color plane to generate the white color plane; and decompressing a run length encoded cyan or magenta color plane to generate the cyan or magenta color plane.

30. The method as recited in claim 29, wherein:

the first value and the third value correspond to a logic one; and the second value and the fourth value correspond to a logic zero.

* * * * *